United States Patent [19]

Cox

[11] 4,072,254

[45] Feb. 7, 1978

[54] DISPENSING GUNS

[75] Inventor: John Patrick Anthony Cox, Eddington, England

[73] Assignee: P.C. Cox (Mastic Appliances) Limited, Newbury, England

[21] Appl. No.: 703,262

[22] Filed: July 7, 1976

[51] Int. Cl.² ........................................... G01F 11/00
[52] U.S. Cl. ............................................... 222/391
[58] Field of Search ................ 222/391, 327, 386, 326

[56] References Cited

U.S. PATENT DOCUMENTS

| 1,594,200 | 7/1926 | Hill | 222/391 X |
| 2,530,359 | 11/1950 | Peterson | 222/327 X |
| 2,877,935 | 3/1959 | Sherbondy | 222/391 X |

FOREIGN PATENT DOCUMENTS 280,799  12/1930  Italy ........................... 222/391

Primary Examiner—Robert B. Reeves
Assistant Examiner—Frederick R. Handren
Attorney, Agent, or Firm—Oblon, Fisher, Spivak, McClelland & Maier

[57] ABSTRACT

A gun for dispensing viscous material, for example a mastic caulking material, and comprising a holder for a cartridge projecting from one edge of a generally plate-like stock in which a rod is mounted for movement longitudinally of itself, and a mechanism for advancing the rod longitudinally of itself to express material from the cartridge. The rod is mounted in the plate-like stock by being passed between bridge portions integral with the stock and deformed out of the general plane of the stock in opposite directions.

6 Claims, 4 Drawing Figures

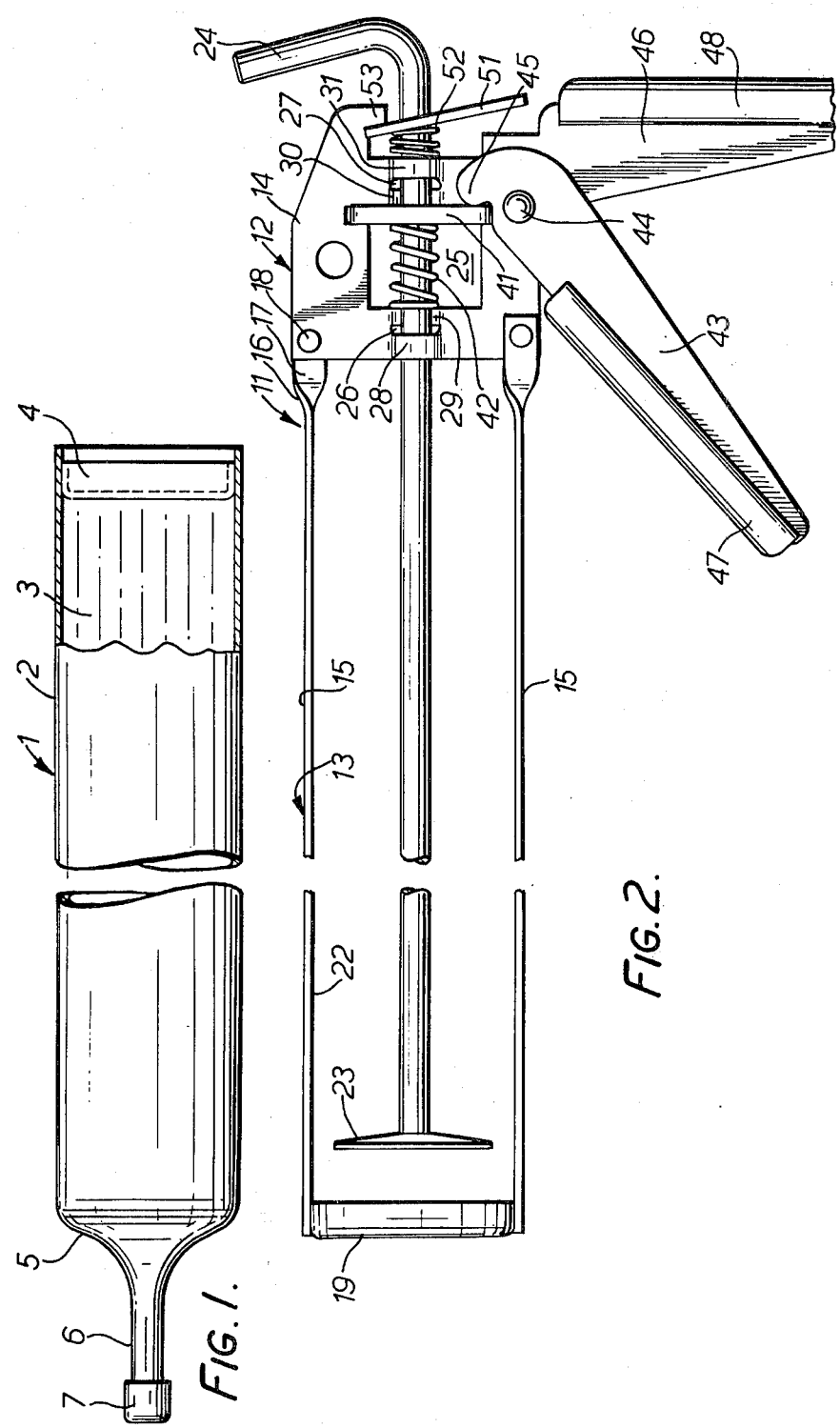

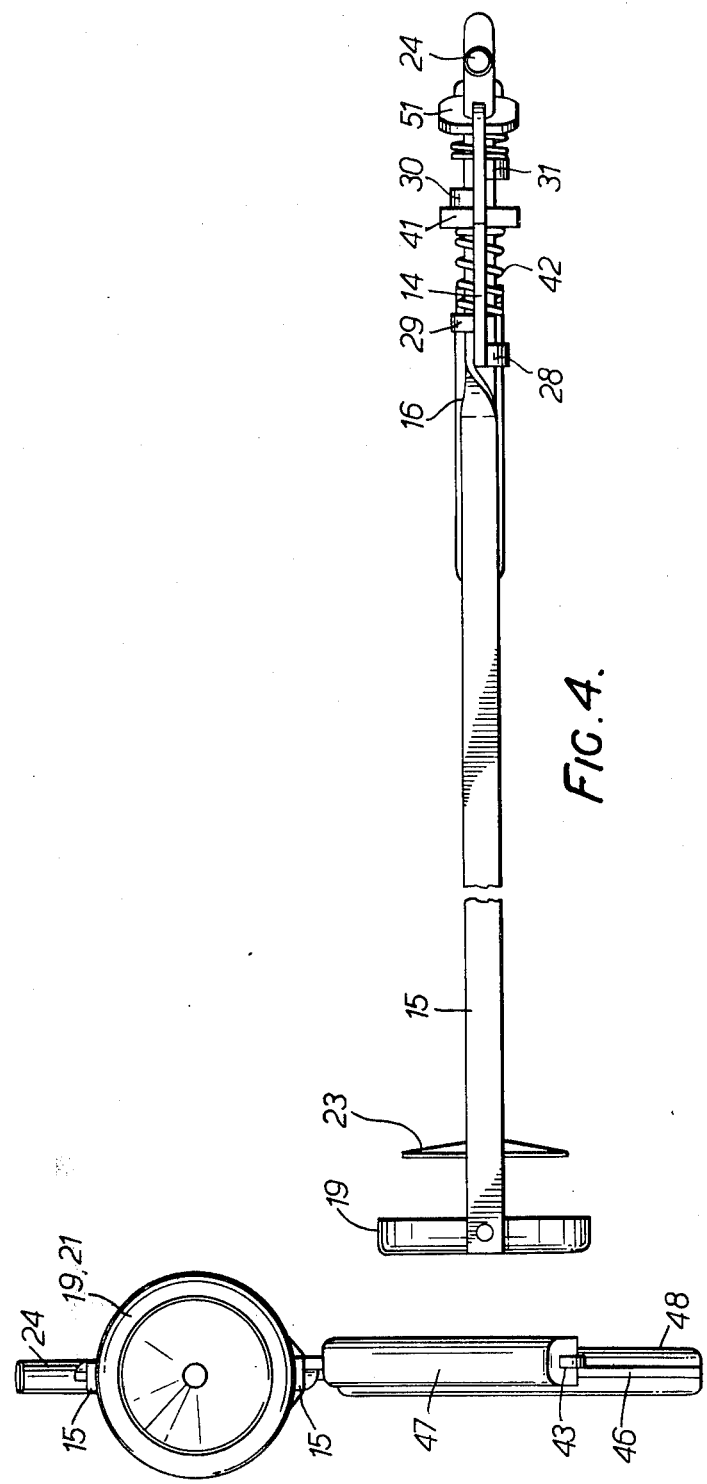

DISPENSING GUNS

BACKGROUND OF THE INVENTION

This invention relates to a dispensing gun for dispensing viscous materials which may be of a thick liquid nature or a pasty nature, for example a mastic caulking material.

Such viscous materials are sometimes supplied in a cartridge which, when in use, is open at one end and has a discharge orifice at the other end. By suitably advancing a plunger into the cartridge from its open end, the viscous material can be dispensed from the discharge orifice.

Such guns generally comprise means such as a tube for holding a cartridge and a body portion similar to a pistol and comprising a main portion in which a reciprocating rod is mounted and a butt portion by which the gun can be held. There is a trigger which depends from the body portion alongside the butt portion and which, when it is squeezed, advances the rod. An example of such a construction is found in British Pat. No. 1,264,311 of Patrick C. Cox, published Feb. 23, 1972. In this gun, as with the majority of such guns produced hitherto, the stock comprising the body and butt is formed as a complex die casting and the trigger is formed as another complex die casting. The cost of dies for such castings is high and the cost of producing objects from such dies is also high since casting has to be at comparatively high temperatures and relatively expensive alloys must be used. Moreover, such die castings tend to be brittle and, while they can be designed to be aesthetically pleasing, this property is of less importance than strength and long life when it is realised that such dispensing guns are used mainly in industrial and construction environments.

SUMMARY OF THE INVENTION

In accordance with the present invention, a dispensing gun for dispensing viscous material from a generally cylindrical cartridge comprises a generally plate-like stock and a holder for the cartridge projecting from one edge of the stock. The gun also includes a rod mounted in the stock for movement longitudinally of itself with its axis extending substantially in or parallel with the plane of the stock, and means for advancing the rod longitudinally of itself.

This construction is very much cheaper than those previously employed, yet it is very robust and reliable. The stock may be formed from sheet metal as by a stamping operation and thus both the material costs and the manufacturing costs are very low.

Although the rod may be mounted on the stock in various ways, for example by brackets (which may be integral with and bent out from the stock), the rod is preferably mounted by being engaged on one side by one portion of the stock and being engaged on the other side by two portions of the stock, the three portions being spaced longitudinally along the rod with the said one portion between the said two portions, at least the said one portion or the said two portions being displaced from the general plane of the stock. In a preferred arrangement, the said one portion is displaced from the general plane of the stock in one direction and the said two portions are displaced from the general plane of the stock in the opposite direction. Provided that the displacements are by equal amounts, the axis of the rod will thus lie in the general plane of the stock.

The said portions may be tongues produced by slots extending into the stock from an edge, but preferably each of the portions is a bridge bounded by edges generally perpendicular to the axis of the rod and by ends which merge into the remainder of the stock.

As in the gun of British Pat. No. 1,264,311 to P. C. Cox referred to above, the means for advancing the rod longitudinally of itself may comprise a movable one-way gripper arranged for reciprocation longitudinally of the rod and arranged to tilt relative to the axis of the rod between a rod-gripping position on the forward stroke of reciprocation of the gripper to advance the rod and a rod-release position on the rearward stroke of reciprocation of the gripper to return without moving the rod. A trigger may be pivotally mounted on the stock, the trigger having an actuating end which bears against the rearward side of the gripper, and the stock may include a butt extending generally transverse to the axis of the rod, the trigger, in the pulled condition, extending alongside the butt. The trigger may be formed of sheet metal and, where the stock is also formed of sheet metal, the two are of the same thickness and may therefore be produced from the same sheet of material, possibly in the same stamping operation and this further increases the cheapness of the gun.

The holder comprises two elongate members extending from the stock parallel with and on either side of the axis of the rod and an annular member connected to the ends of the elongate members remote from the stock and lying in a plane normal to the axis of the rod. Preferably, the elongate members are metal strips, each having a 90° twist adjacent the stock, to provide an end portion which lies flat against and is bonded to the stock, for example, by spot welding. This cheap and simple construction is made possible by the use of sheet metal instead of moulded light alloy for the stock or body of the gun. The said end portions of the two strips lie on opposite sides of the stock to simplify centering of the annular member relative to the axis of the rod.

BRIEF DESCRIPTION OF THE DRAWINGS

FIG. 1 shows a cartridge partly in side elevation and partly in longitudinal section;

FIG. 2 is a side elevation of the dispensing gun according to the invention;

FIG. 3 is an end elevation of the gun viewed from the left-hand side as seen in FIG. 2; and FIG. 4 is a plan view of the gun.

DETAILED DESCRIPTION OF THE PREFERRED EMBODIMENT

The cartridge 1 shown in FIG. 1 has a generally cylindrical body 2 containing a viscous material 3, such as a caulking mastic. The cylindrical body is open at one end and contains a free cup-shaped piston 4 which is slidable along the length of the body 2. The opposite end of the cartridge is constricted to form a shoulder 5 leading to a nozzle 6 having an open end closed by a cap 7.

The gun 11 shown in FIGS. 2 to 4 is intended to dispense material from the cartridge 1 and comprises a stock 12 and a cartridge holder 13. The stock 12 is made of a single metal plate 14 which is cut and formed in a single stamping operation. The holder 13 comprises two elongate members 15 formed by metal strips each having a 90° twist 16 adjacent the stock 12, the end portion 17 of each strip being bonded to the stock 12 by spot welding indicated by the circle 18. The opposite ends of the strips 15 are joined by spot welding to an annular generally cup-shaped member 19 having a large opening 21 in its base.

A rod 22 is mounted on the stock 12 for movement longitudinally of itself and with its axis lying midway between the two strips 15. At one end of the rod 22 there is a plunger 23, while the other end is formed as a hook 24 by which the gun may be suspended when it is not in use and which acts as a handle by which the rod 22 may be moved longitudinally.

The stock 12 has a large central aperture 25 and on either side there are slits 26 and 27 to form four straps or bridges 28, 29, 30, 31. The outer bridges 28 and 31 are deformed out of the general plane of the plate 14 towards the viewer, as seen in FIG. 2, while the bridges 29 and 30 are deformed out of the general plane of the plate 14 in a direction away from the viewer. The rod 22 is passed through the slits 26 and 27 so that the rod is supported on one side by the bridges 28 and 31, while it is supported on the other side by the bridges 29 and 30, both of which lie between the bridges 28 and 31. This provides a very simple and cheap, but effective, means of mounting the rod for longitudinal movement.

The rod can be moved incrementally by a mechanism comprising a gripper plate 41 having an opening through which the rod passes and which is only slightly larger than the rod. The gripper plate 41 is guided by the aperture 25 and is biased to the right, as seen in FIG. 2, by a compression spring 42 surrounding the rod 22. The gripper plate 41 can be tilted and advanced by means of a trigger 43 pivoted on the stock 12 by a rivet 44, the trigger 43 having an actuating end 45 to engage the gripper plate 41. The trigger 43 is made of the same sheet metal as the stock 12 and is produced in the same stamping operation. The stock 12 has an integral butt portion 46 which extends downwardly and generally perpendicularly to the axis of the rod 22 and, when the trigger 43 is pulled, the trigger lies generally alongside the butt portion 46. The edges of the trigger 43 and of the butt portion 46 which are engaged by the fingers and palm of an operator have protective plastics channels 47 and 48 which are retained thereon by the resilience of the plastics and/or by an adhesive.

Return travel of the rod 22 is normally prevented by a catch 51, which is an apertured plate similar to the gripper plate 41, and is biased to the rod by a spring 52, its upper edge being trapped by a nose 53 on the stock 12.

In use, with the trigger 43 released, the catch plate 51 is depressed by a thumb and the rod 22 is fully retracted by pulling on the handle 24. The cartridge 1 is then inserted into the holder with the shoulder 5 engaging the inner surface of the bottom of the cup-shaped annular member 19 and with the nozzle 6 projecting through the opening 21 in this member. The rod 22 is then advanced by successive squeezes and releases of the trigger 43 until the plunger 23 engages the piston 4 in the cartridge 1. When it is required to dispense the contents of the cartridge, the trigger is squeezed, thus advancing the piston 4 and expressing the mastic 3 through the nozzle 6. When the cartridge is exhausted, the rod 22 is again retracted and the empty cartridge is replaced by a full one.

It is therefore apparent that the present invention provides a dispensing gun which can be made of simple and low-cost materials by means of few and simple manufacturing operations. The gun is therefore very cheap but nevertheless is extremely strong and reliable.

It will be obvious that various modifications can be made, and accordingly it is pointed out that the foregoing description is illustrative of the preferred embodiment only and is not to be considered limiting. The true spirit and scope of the present invention may be determined by reference to the appendant claims.

What I claim as my invention and desire to secure by letters patent is:

1. A dispensing gun for dispensing viscous material from a generally cylindrical cartridge, the gun comprising:

a generally plate-like stock formed from sheet metal;
   a cartridge holder projecting from one edge of said stock;
   a rod mounted in said stock by being engaged on one side by a first bridge bounded by edges generally perpendicular to the axis of the rod and by ends which merge into the remainder of said stock and being engaged on the side opposite to said one side by two other bridges, each bounded by edges generally perpendicular to the axis of the rod and by ends which merge into the remainder of said stock, said three bridges being spaced longitudinally along said rod with said first bridge between said two other bridges, said first bridge being displaced from the general plane of the stock in one direction and said two other bridges being displaced from the general plane of the stock in the opposite direction, whereby the rod is movable longitudinally of itself with its axis extending substantially in or parallel with the plane of said stock; and
   means for advancing said rod longitudinally of itself.

2. A dispensing gun for dispensing viscous material from a generally cylindrical cartridge, the gun comprising a generally plate-like stock formed of sheet metal, a cartridge holder projecting from one edge of said stock, a rod mounted in said stock for movement longitudinally of itself with its axis extending substantially in or parallel with the plane of said stock, and means for advancing said rod longitudinally of itself, wherein said holder comprises two metal strips extending from said stock parallel with and on either side of the axis of the rod and an annular member connected to the ends of the metal strips remote from said stock and lying in a plane normal to the axis of the rod, said metal strips each having a 90° twist adjacent said stock to provide an end portion which lies flat against and is bonded to said stock.

3. A dispensing gun according to claim 2 wherein said end portions of said two strips lie on opposite sides of said stock.

4. A dispensing gun for dispensing viscous material from a generally cylindrical cartridge, the gun comprising:

a flat sheet metal stock having a body portion and a butt portion depending therefrom, the stock having apertures therein defining a plurality of integral bridge portions at least one of which is displaced in one direction out of the general plane of the stock and at least two of which are displaced in the opposite direction out of the general plane of the stock, whereby a passage is formed having a longitudinal axis lying in the plane of the stock;
   a cartridge holder comprising two elongate metal members each welded at one end to said stock and extending away from said stock parallel with said longitudinal axis, and an annular metal member welded to the other end of each elongate member;

a rod mounted for reciprocation in said passage;

a plunger on one end of said rod and positioned between said annular member and said stock;

a sheet metal trigger pivoted to said stock and extending alongside said butt portion; and a gripper having an aperture through which said rod passes and mounted in one of said apertures in said stock for tilting movement relative to the axis of said rod, said trigger having a portion engageable with a point on said gripper spaced from the axis of said rod, whereby squeezing of said trigger towards said butt firstly tilts said gripper to grip said rod and secondly advances said gripper and said gripped rod to advance said plunger toward said annular member.

5. A dispensing gun according to claim 4 wherein each of said metal members is a metal strip having a 90° twist adjacent said stock to provide an end portion which lies flat against and is welded to said stock.

6. A dispensing gun according to claim 5 wherein said end portions of said two strips lie on opposite sides of said stock.

* * * * *